(12) United States Patent  (10) Patent No.: US 7,682,744 B2
Sawa et al. (45) Date of Patent: Mar. 23, 2010

(54) LITHIUM SECONDARY BATTERY (75) Inventors: Shouichirou Sawa, Tokushima (JP); Hiroshi Minami, Kobe (JP); Atsushi Fukui, Kobe (JP); Taizou Sunano, Tokushima (JP); Takuya Sunagawa, Naruto (JP); Maruo Kamino, Tokushima (JP); Toshio Yanagida, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 305 days.

(21) Appl. No.: 11/231,982

(22) Filed: Sep. 22, 2005

(65) Prior Publication Data

US 2006/0068290 A1 Mar. 30, 2006

(30) Foreign Application Priority Data

Sep. 24, 2004 (JP) ............... 2004-276551
Jul. 22, 2005 (JP) ............... 2005-212230

(51) Int. Cl.
H01M 4/00 (2006.01)
H01M 4/58 (2006.01)
H01M 4/50 (2006.01)
H01M 6/04 (2006.01)

(52) U.S. Cl. .............. 429/223; 429/218.1; 429/224; 429/344

(58) Field of Classification Search ......... 429/223–232, 429/344
See application file for complete search history.

(56) References Cited

U.S. PATENT DOCUMENTS 6,235,427 B1  5/2001  Idota et al. ............ 429/218.1
2004/0043294 A1  3/2004  Fukui et al. ............ 429/235
2004/0062991 A1  4/2004  Fukui et al. ............ 429/218.1
2006/0121335 A1*  6/2006  Seyama ............ 429/50
2006/0127769 A1*  6/2006  Fujimoto et al. ......... 429/231.1

FOREIGN PATENT DOCUMENTS

JP  11-354118 A  12/1999
JP  2002-42813 A  2/2002
JP  2002-260637 A  9/2002

(Continued)

OTHER PUBLICATIONS

Choi, J. et al., "Role of Chemical and Structural Stabilities on the Electrochemical Properties of Layered LiNi⅓Mn⅓Co⅓O₂ Cathodes", *Journal of The Electrochemical Society*, 152 (9) pp. A1714-A1718 (2005).
Kun, Huang, "Research on the factors affecting cycle life of lithium ion battery", China Academic Journal Electronic Publishing House, vol. 6, No. 1, pp. 29-31 (2001).

*Primary Examiner*—Patrick Ryan
*Assistant Examiner*—Muhammad Siddiquee
(74) *Attorney, Agent, or Firm*—Kubovcik & Kubovcik (57) ABSTRACT

A lithium secondary battery having high capacity and good charge-discharge cycle performance is provided. The lithium secondary battery includes a negative electrode (2) containing silicon as a negative electrode active material, a positive electrode (1) containing a positive electrode active material, and a non-aqueous electrolyte. The positive electrode active material is a lithium-transition metal composite oxide including a layered structure represented by the chemical formula $Li_aNi_xMn_yCo_zO_2$, where a, x, y, and z satisfy the expressions: $0 \leq a \leq 1.3$, $x+y+z=1$, $0<x$, $0 \leq y \leq 0.5$, and $0 \leq z$.), and the theoretical electrical capacity ratio of the positive electrode to the negative electrode (positive electrode/negative electrode) is 1.2 or less.

15 Claims, 1 Drawing Sheet

FOREIGN PATENT DOCUMENTS

| | | |
|---|---|---|
| JP | 2005-32713 A | 2/2005 |
| JP | 2005-63674 A | 3/2005 |
| JP | 2005-149867 A | 6/2005 |
| JP | 2005-150057 A | 6/2005 |
| WO | WO 2004042861 * | 5/2004 |
| WO | WO 2004/066422 * | 8/2004 |

* cited by examiner

LITHIUM SECONDARY BATTERY

BACKGROUND OF THE INVENTION

1. Field of the Invention

The present invention relates to lithium secondary batteries that use a material containing silicon as a negative electrode active material.

2. Description of Related Art

In recent years, lithium secondary batteries using a non-aqueous electrolyte and performing charge-discharge operations by transferring lithium ions between positive and negative electrodes have been utilized as a new type of high power, high energy density secondary battery.

Because of their high energy density, lithium secondary batteries have been widely used as power sources for electronic portable devices related to information technology, such as mobile telephones and notebook computers. It has been expected that, due to further size reduction and advanced functions of these portable devices, load to the lithium secondary batteries used as the device power sources will keep increasing in the future, and demands for higher energy density in the lithium secondary batteries have been very high.

An effective means to achieve higher energy density in a battery is to use a material having a greater energy density as its active material. Recently, it has been proposed and studied to use an alloy material of an element such as Al, Sn, or Si, that intercalates lithium through an alloying reaction with lithium as a negative electrode active material having higher energy density in lithium secondary batteries, in place of graphite, which has been in commercial use.

In the electrode using a material alloyed with lithium as its active material, however, the active material expands and shrinks in volume during the intercalation and deintercalation of lithium, causing the active material to pulverize or peel off from the collector. This leads to the problem of lowering current collection performance in the electrode and degrading a battery's charge-discharge cycle performance.

The present applicant has found that, with a negative electrode using a material containing silicon as its negative electrode active material that is capable of being alloyed with lithium, high current collection performance and good charge-discharge cycle performance are achieved by a negative electrode formed by sintering a mixture layer containing the active material and a binder in a non-oxidizing atmosphere and disposing the mixture layer on a surface of a current collector made of a conductive metal foil having surface irregularities (Japanese Published Unexamined Patent Application No. 2002-260637).

Silicon shows a higher potential during absorbing lithium than negative electrodes with graphite materials and metallic lithium. For this reason, a battery using silicon as its negative electrode active material has a higher positive electrode potential than a battery using metallic lithium or a carbon material as its negative electrode active material, if the same lithium-transition metal composite oxide is used as their positive electrode active material and the batteries are used in the same voltage range. Thus, the reactivity between the positive electrode active material and the non-aqueous electrolyte solution becomes high in the battery using silicon as its negative electrode active material. Since this reaction between the positive electrode active material and the non-aqueous electrolyte solution is a side reaction that does not directly influence the lithium intercalation/deintercalation reaction, the problem of degradation in the charge-discharge cycle performance arises. Moreover, because a higher positive electrode potential during charge causes a greater amount of lithium ions in the positive electrode active material to be deintercalated, the crystal structure of the positive electrode active material becomes unstable and the transition metals in the positive electrode active material tend to dissolve into the electrolyte solution easily. The dissolved metals can deposit on the negative electrode surface during charge and inhibit the lithium intercalation/deintercalation reaction at the negative electrode surface, consequently degrading the battery's charge-discharge cycle performance.

BRIEF SUMMARY OF THE INVENTION

It is an object of the present invention to provide a lithium secondary battery using silicon as its negative electrode active material that has high capacity and excellent charge-discharge cycle performance.

The present invention provides a lithium secondary battery, comprising: a negative electrode containing silicon as a negative electrode active material; a positive electrode containing a positive electrode active material; and a non-aqueous electrolyte, wherein the positive electrode active material is a layered lithium-transition metal composite oxide represented by the chemical formula $Li_aNi_xMn_yCo_zO_2$, where a, x, y, and z satisfy the expressions $0 \leq a \leq 1.3$, $x+y+z=1$, $0<x$, $0 \leq y \leq 0.5$, and $0 \leq z$, and a theoretical electrical capacity ratio of the positive electrode to the negative electrode (positive electrode/negative electrode) is 1.2 or less.

In one embodiment of the present invention, x, y, and z in the foregoing chemical formula satisfy the expressions $0<x \leq 0.5$, $0 \leq y \leq 0.5$, and $0 \leq z$. In another embodiment according to the present invention, z in the foregoing chemical formula satisfies the expression $0<z$. Thus, the positive electrode active material contains at least Ni and Co as transition metals.

In the present invention, the layered lithium-transition metal composite oxide represented by the foregoing chemical formula is used as the positive electrode active material, and the theoretical electrical capacity ratio of the positive electrode to the negative electrode is set at 1.2 or less; therefore, the reaction between the positive electrode active material and the non-aqueous electrolyte solution is prevented during charging and discharging. Moreover, since the positive electrode active material has a highly stable crystal structure even at a high potential during charging, the transition metals can be prevented from being dissolved away from the positive electrode active material, and good charge-discharge cycle performance can be obtained.

DETAILED DESCRIPTION OF THE PREFERRED EMBODIMENTS

In the present invention, since the above-described theoretical electrical capacity ratio is set at 1.2 or less, the utilization factor of the negative electrode is low. Therefore, the change in volume of silicon is small when it intercalates and deintercalates lithium ions, preventing the silicon from cracking during charge and discharge. In this respect as well, good charge-discharge cycle performance can be obtained.

The lithium-transition metal composite oxide used as a positive electrode active material in the present invention can be prepared by a known method such as that described in J. Choi and A. Manthiram, *Journal of the Electrochemical Society*, 152 (9) A1714-A1718 (2005), which is incorporated herein by reference.

The lithium-transition metal composite oxide used as a positive electrode active material in the present invention is stable even at high potential. In the present invention, the theoretical electrical capacity ratio is set at 1.2 or less and the utilization factor of the negative electrode is lowered; therefore, the potential of the negative electrode at the end of charge becomes high, and accordingly the potential of the positive electrode at the end of charge also becomes high. Nevertheless, the present invention can attain good charge-discharge cycle performance because it utilizes the foregoing lithium-transition metal composite oxide, which is stable at high potential.

When the theoretical electrical capacity ratio of the positive electrode to the negative electrode exceeds 1.2, the utilization factor of the negative electrode is high, degrading charge-discharge cycle performance. Moreover, in the present invention, it is preferred that the theoretical electrical capacity ratio be at least 0.4. When the theoretical electrical capacity ratio is less than 0.4, battery capacity degrades because the relative proportion of the positive electrode active material contained in the battery is small.

It is preferred that carbon dioxide be dissolved in the non-aqueous electrolyte in the present invention. By allowing carbon dioxide to dissolve in the non-aqueous electrolyte, the lithium intercalation/deintercalation reaction occurs smoothly at the surface of the lithium-transition metal composite oxide, resulting in more excellent charge-discharge cycle performance. Also, a surface film originating from carbon dioxide forms on the surface of the silicon, which is the negative electrode active material, and consequently the lithium intercalation/deintercalation reaction at the negative electrode active material surface occurs smoothly, making it possible to attain more excellent cycle performance.

The amount of carbon dioxide to be dissolved is preferably 0.01 weight % or greater, more preferably 0.05 weight % or greater, and still more preferably 0.1 weight % or greater.

In the present invention, it is preferred that the positive electrode active material contain lithium carbonate at 0.2 weight % or greater. The lithium carbonate contained in the positive electrode active material decomposes during charge, that is, when lithium ions are deintercalated from the positive electrode active material and the potential of the positive electrode is increased, thus producing carbon dioxide. The carbon dioxide allows the lithium intercalation/deintercalation reaction at the negative electrode active material surface to take place appropriately. For that reason, allowing the positive electrode active material to contain lithium carbonate makes it possible to attain good charge-discharge cycle performance. Furthermore, this effect of improving charge-discharge cycle performance because of lithium carbonate becomes more effective when carbon dioxide is dissolved in the non-aqueous electrolyte. The lithium carbonate contained in the positive electrode active material may, for example, originate from the residue of the lithium carbonate that was used as a source material and remained therein even after the production of the lithium-transition metal composite oxide, or it may originate from the lithium component within the lithium-transition metal composite oxide that is reacted with carbon dioxide in an ambient gas or in the atmosphere. Alternatively, it is possible to separately add a lithium carbonate to the positive electrode active material so that the positive electrode active material contains the lithium carbonate.

In addition, a large amount of Ni component in the lithium-transition metal composite oxide tends to facilitate the production of lithium carbonate originating from the reaction between carbon dioxide and the lithium component in the oxide. For that reason, in the present invention, it is preferred that the lithium-transition metal composite oxide used as a positive electrode active material contain a greater amount of Ni component, because the effect of improving charge-discharge cycle performance because of lithium carbonate will be greater accordingly.

The amount of lithium carbonate contained in the positive electrode active material is preferably 5 weight % or less of the positive electrode active material. If the amount exceeds 5 weight %, side reactions may occur because of the excessive lithium carbonate, which may degrade battery performance.

It is preferred that the lithium-transition metal composite oxide used in the present invention have a BET specific surface area of 3 $m^2/g$ or less. By restricting the BET specific surface area to be 3 $m^2/g$ or less, side reactions with the non-aqueous electrolyte can be prevented and good cycle performance can be obtained.

The BET specific surface area is preferably 0.1 $m^2/g$ or greater.

It is preferred that the lithium-transition metal composite oxide in the present invention have an average particle size (average particle size of secondary particles) of 20 μm or less. If the average particle size exceeds 20 μm, the distance over which lithium ions within particles of the lithium-transition metal composite oxide need to travel becomes large, and charge-discharge cycle performance may degrade. The average particle size of commonly available lithium-transition metal composite oxide is 5 μm or greater.

It is preferred that the positive electrode in the present invention be such that a positive electrode mixture layer containing the foregoing lithium-transition metal composite oxide as a positive electrode active material, a positive electrode conductive agent, and a positive electrode binder is disposed on a positive electrode current collector made of a conductive metal foil.

Various known conductive agents may be used as the positive electrode conductive agent; for example, conductive carbon materials may be preferably used. In particular, acetylene black and Ketjen Black may be preferably used. The particle size of the conductive agent is preferably about 100 nm.

Various known binders may be used as the positive electrode binder; for example, fluoropolymers such as polyvinylidene fluoride may preferably be used.

The positive electrode active material used in the present invention is a layered lithium-containing nickel-manganese-cobalt composite oxide, or a layered lithium-containing nickel-manganese composite oxide, that is represented by the foregoing chemical formula. The advantageous effect of enhancing charge-discharge cycle performance that is specific to the present invention can be attained by setting the foregoing theoretical electrical capacity ratio to be 1.2 or less in the case of using the just-mentioned lithium-transition metal composite oxide as a positive electrode active material and also using a material containing silicon as a negative electrode active material.

The solvent for non-aqueous electrolyte used in the present invention is not particularly limited. Examples include: cyclic carbonates such as ethylene carbonate, propylene carbonate, butylene carbonate, and vinylene carbonate; chain carbonates such as dimethyl carbonate, methyl ethyl carbonate, and diethyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitrites such as acetonitrile; and amides such as dimethylformamide. These substances may be used either alone of in combination. Particularly preferable is a mixed solvent of a cyclic carbonate and a chain carbonate.

Examples of the solute of the non-aqueous electrolyte include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. Especially preferable is a mixture solute of $LiXF_y$ (wherein X is P, As, Sb, B, Bi, Al, Ga, or In, and y is 6 when X is P, As, or Sb or y is 4 when X is B, Bi, Al, Ga, or In) and either lithium perfluoroalkylsulfonic imide $LiN(C_mF_{2m+1}SO_2)(C_nF_{2n+1}SO_2)$ (wherein m and n denote, independently of one another, an integer of from 1 to 4) or lithium perfluoroalkylsulfonic methide $LiC(C_pF_{2p+1}SO_2)(C_qF_{2q+1}SO_2)(C_rF_{2r+1}SO_2)$ (wherein p, q, and r denote, independently of one another, an integer of from 1 to 4). Among them, $LiPF_6$ is particularly preferable.

Examples of the electrolyte include a gelled polymer electrolyte in which an electrolyte solution is impregnated in a polymer electrolyte made of polyethylene oxide, polyacrylonitrile, or the like, and inorganic solid electrolytes such as LiI or $Li_3N$. There is no limitation as to the electrolyte of the lithium secondary battery of the present invention and any solute may be used as long as the lithium compound as the solute for providing ionic conductivity and the solvent for dissolving and retaining the solute do not decompose at a voltage during charge and discharge, or during storage of the battery.

It is preferred that the negative electrode in the present invention is such that a negative electrode mixture layer including a binder and active material particles containing silicon and/or silicon alloy is disposed on a negative electrode current collector made of a conductive metal foil. Examples of the silicon alloy include solid solutions made of silicon and one or more other elements, intermetallic compounds made of silicon and one or more other elements, and eutectic alloys made of silicon and one or more other elements. Examples of the method for producing the alloy include arc melting, liquid quenching, mechanical alloying, sputtering, chemical vapor deposition, and baking. Specifically, examples of the liquid quenching include a single-roll quenching technique, a double-roller quenching technique, and various atomization techniques such as gas atomization, water atomization, and disk atomization.

The negative electrode active material used in the present invention may be one in which surfaces of particles of silicon and/or silicon alloy are coated with metal or the like. Examples of the method of coating include electroless plating, electroplating, chemical reduction techniques, evaporation, sputtering, and chemical vapor deposition.

In the present invention, particles made of silicon alone are the most preferable as the negative electrode active material.

Although not particularly limited, the average particle size of the negative electrode active material in the present invention is preferably 100 μm or less, more preferably 50 μm or less, and most preferably 10 μm or less. Using active material particles having a small particle size serves to reduce the absolute magnitude of the expansion and shrinkage in volume of the active material particles that are associated with lithium intercalation and deintercalation during charging and discharging. This accordingly reduces the absolute magnitude of the strain between the active material particles in the electrode during charging and discharging, making destruction of the binder less likely to occur. Thus, it becomes possible to prevent the current collection performance in the electrode from degrading and to attain outstanding charge-discharge cycle performance.

It is preferred that the particle size distribution of the negative electrode active material in the present invention be as narrow as possible. If the particle size distribution is wide, great differences in the absolute magnitude of expansion and shrinkage in volume associated with lithium intercalation and deintercalation will exist among active material particles with widely diverse particle sizes. Therefore, strain will occur within the mixture layer, leading to destruction of the binder. Consequently, current collection performance in the electrode lowers, degrading the charge-discharge cycle performance.

In the negative electrode current collector of the present invention, it is preferred that a surface on which the negative electrode mixture layer is to be disposed have a surface roughness Ra of 0.2 μm or greater. When using a conductive metal foil having such a surface roughness Ra as the negative electrode current collector, the binder gets into the portions of the current collector surface in which the surface irregularities exist, thereby to provide an anchoring effect and attain strong adhesion between the binder and the current collector. As a result, it is possible to prevent the peeling off of the mixture layer from the current collector, which results from the expansion and shrinkage in volume of the active material particles that are associated with the lithium intercalation and deintercalation. Where both sides of the current collector are provided with the negative electrode mixture layer, it is preferred that the surface roughness Ra be 0.2 μm or greater on both sides of the negative electrode.

It is preferred that surface roughness Ra and mean spacing of local peaks S have a relationship $100Ra \geq S$. Surface roughness Ra and mean spacing of local peaks S are defined in Japanese Industrial Standards (JIS B 0601-1994) and can be measured by, for example, a surface roughness meter.

To provide the current collector with a surface roughness Ra of 0.2 μm or greater, the conductive metal foil may be subjected to a roughening process. Examples of the roughening process include plating, vapor deposition, etching, and polishing. The plating and the vapor deposition are techniques in which a surface of the metal foil is roughened by forming a thin film layer having irregularities on the metal foil surface. Examples of the plating include electroplating and electroless plating. Examples of the vapor deposition include sputtering, chemical vapor deposition, and evaporation. Examples of the etching include such techniques as physical etching and chemical etching. Examples of the polishing include polishing by sandpaper and polishing by blasting.

The current collector in the present invention may be made of a foil of a metal such as copper, nickel, iron, titanium, or cobalt, or may be an alloy foil formed of a combination thereof.

It is particularly preferred that the negative electrode current collector in the present invention have a high mechanical strength. When the current collector has a high mechanical strength, the current collector does not suffer destruction or plastic deformation even if the current collector undergoes a stress that occurs due to the change in volume of the negative electrode active material at the time of lithium intercalation and deintercalation. As a result, the mixture layer is prevented from peeling off from the current collector, the current collection performance in the electrode is maintained, and good cycle performance is attained.

Although not particularly limited, the thickness of the current collector in the present invention is preferably within the range of from 10 µm to 100 µm.

The upper limit of the surface roughness Ra of the current collector in the present invention is not particularly limited. However, because it is preferred, as mentioned above, that the thickness of the conductive metal foil be within the range of from 10 µm to 100 µm, the upper limit of the surface roughness Ra is essentially 10 µm or less.

In the negative electrode of the present invention, it is preferred that the thickness of the negative electrode mixture layer X have relationships with current collector thickness Y and surface roughness Ra represented by $5Y \geqq X$ and $250Ra \geqq X$, respectively. If the mixture layer thickness X is greater than 5Y, or greater than 250Ra, the expansion and shrinkage in volume of the mixture layer during charging and discharging are so great that the adhesion between the mixture layer and the current collector cannot be maintained by the irregularities in the current collector surface, causing the mixture layer to peel off from the current collector.

Although not particularly limited, the thickness of the negative electrode mixture layer X in the present invention is preferably 1000 µm or less, and more preferably from 10 µm to 100 µm.

It is preferred that the negative electrode binder in the present invention have a high mechanical strength and good elasticity. When the binder has good mechanical properties, the binder does not suffer destruction and the mixture layer can deform according to the change in volume of the active material, even if a change in volume of the negative electrode active material occurs at the time of lithium intercalation and deintercalation. As a consequence, the current collection performance in the electrode is maintained, and outstanding cycle performance is obtained. The binder having good mechanical properties may be polyimide resin. In addition, fluoropolymers such as polyvinylidene fluoride and polytetrafluoroethylene may also be suitably used.

In the present invention, it is preferred that the amount of the negative electrode binder be 5 weight % or greater of the total weight of the negative electrode mixture layer, and the volume occupied by the binder be 5% or greater of the total volume of the negative electrode mixture layer. Herein, the total volume of the negative electrode mixture layer is intended to mean the total of the volumes of the materials contained in the mixture layer, such as the active material and the binder, and it does not include the volume of voids in the mixture layer in the case where voids exist in the mixture layer. If the amount of binder is less than 5 weight % of the total weight of the mixture layer and the volume occupied by the binder is less than 5% of the total volume of the mixture layer, the amount of the binder is so small with respect to the negative electrode active material that the adhesion of the binder becomes insufficient in the electrode. On the other hand, if the amount of the binder is too large, the resistance in the electrode increases, making the initial charging difficult. For these reasons, it is preferred that the amount of the negative electrode binder be 50 weight % or less of the total weight of the negative electrode mixture layer and the volume occupied by the binder be 50% or less of the total volume of the negative electrode mixture layer.

In the negative electrode of the present invention, a conductive agent may be mixed in the mixture layer. By mixing a conductive agent in the mixture layer, a conductive network originating from the conductive agent can form around the active material particles, further improving the current collection performance within the electrode. For the conductive agent, the same kinds of materials as those used for the conductive metal foil may be suitably used. Specifically, the suitable materials include metals such as copper, nickel, iron, titanium, and cobalt, as well as alloys and mixtures thereof. In particular, copper powder is used suitably as the conductive agent. In addition, conductive carbon powder may be used.

It is preferred that the amount of the conductive agent to be mixed within the negative electrode mixture layer be 50 weight % or less of the total weight of the negative electrode active material, and the volume occupied by the conductive agent be 20% or less of the total volume of the negative electrode mixture layer. If the amount of the conductive agent mixed is too large, the relative proportion of the negative electrode active material in the negative electrode mixture layer reduces correspondingly and consequently the charge-discharge capacity of the negative electrode becomes small. Moreover, in this case, the proportion of the amount of the binder reduces with respect to the total amount of the active material and the conductive agent in the mixture layer, and therefore, the strength of the mixture layer reduces, degrading the charge-discharge cycle performance.

Although not particularly limited, the average particle size of the conductive agent is preferably 100 µm or less, more preferably 50 µm or less, and most preferably 10 µm or less.

It is further preferred that the negative electrode in the present invention be such that a negative electrode mixture layer including a negative electrode binder and particles containing silicon and/or silicon alloy, which serve as a negative electrode active material, is sintered and disposed on a surface of a conductive metal foil as a negative electrode current collector. When the mixture layer is disposed on the current collector surface by sintering, adhesion between active material particles and adhesion between the mixture layer and the current collector improve greatly due to the effect of the sintering. Therefore, even if a change in volume of the negative electrode active material occurs at the time of lithium intercalation and deintercalation, it is possible to maintain the current collection performance of the mixture layer and to attain good charge-discharge cycle performance.

It is particularly preferable that the negative electrode binder be thermoplastic. For example, when the negative electrode binder has a glass transition temperature, it is desirable to carry out heating for sintering and disposing the negative electrode mixture layer on the negative electrode current collector surface at a temperature higher than the glass transition temperature. This causes the binder to heat-bond with the active material particles and the current collector, greatly improving adhesion between the active material particles and between the mixture layer and the current collector; consequently, the current collection performance within the electrode can be improved greatly, and further excellent cycle performance can be attained.

Further in this case, it is preferred that the negative electrode binder remain without being decomposed completely even after the heating process. If the binder is completely decomposed after the heating process, the bonding effect owing to the binder is lost, and therefore, the current collection performance of the electrode greatly lowers, degrading the charge-discharge cycle performance.

The sintering for disposing the negative electrode mixture layer on the current collector surface should preferably be performed in a nitrogen atmosphere or in an inert gas atmosphere such as argon. Alternatively, the sintering may be performed in a reducing atmosphere such as a hydrogen atmosphere. The heating temperature in the sintering should preferably be equal to or less than the temperature at which the binder resin starts to thermally decompose, because it is preferred that the negative electrode binder remain without being decomposed completely even after the heating process for sintering. The usable methods of the sintering include discharge plasma sintering and hot pressing.

In the present invention, it is preferred that the negative electrode be fabricated by uniformly mixing and dispersing particles containing silicon and/or silicon alloy, which serve as a negative electrode active material, and, optionally, a conductive agent in a solution of a negative electrode binder to produce a negative electrode mixture slurry, and applying the resultant negative electrode mixture slurry onto a surface of a conductive metal foil as a negative electrode current collector. The mixture layer thus produced using a slurry in which the active material particles are uniformly mixed and dispersed in a binder solution forms a structure in which the binder is uniformly distributed around each of the active material particles; therefore, it becomes possible to obtain maximum benefit from the mechanical properties of the binder, to attain high electrode strength, and to obtain good charge-discharge cycle performance.

According to the present invention, a lithium secondary battery having high capacity and good charge-discharge cycle performance can be obtained by using silicon as a negative electrode active material, using a layered lithium-transition metal composite oxide represented by the foregoing chemical formula as a positive electrode active material, and setting the theoretical electrical capacity ratio (positive electrode/negative electrode) of the positive electrode with respect to the negative electrode at 1.2 or less.

Hereinbelow, the present invention is described in further detail based on examples thereof. It should be construed, however, that the present invention is not limited to the following examples, and various changes and modifications are possible.

Experiment 1

Preparation of Positive Electrode

LiOH and a coprecipitated hydroxide represented as $Ni_{0.4}Mn_{0.3}Co_{0.3}(OH)_2$ were mixed in a mortar so that the mole ratio of Li to the whole of the transition metals became 1:1. Thereafter, the mixture was sintered at 1000° C. for 20 hours in an air atmosphere and thereafter pulverized, to thus obtain a lithium-transition metal composite oxide represented as $LiNi_{0.4}Mn_{0.3}Co_{0.3}O_2$ and having an average particle size of about 5 µm. The resultant lithium-transition metal composite oxide had a BET specific surface area of 1.01 m²/g.

$LiMn_{0.4}Ni_{0.3}Co_{0.3}O_2$ powder as a positive electrode active material, acetylene black as a positive electrode conductive agent, and polyvinylidene fluoride as a positive electrode binder were added to N-methyl-2-pyrrolidone as a dispersion medium so that the weight ratio of the active material, the conductive agent, and the binder became 94:3:3, and the mixture was kneaded to obtain a positive electrode mixture slurry.

The resultant positive electrode mixture slurry was applied onto one side of an aluminum foil (thickness 15 µm) serving as a positive electrode current collector and then dried, and thereafter, the resultant material was pressure-rolled. The amount of the mixture layer on the current collector was 22.45 mg/cm². This resultant article was cut out into a 20 mm×20 mm square shape, and a current collector tab was attached thereto. A positive electrode was thus prepared.

Preparation of Negative Electrode

Silicon powder (purity: 99.9%) having an average particle size of 3 µm, which serves as a negative electrode active material, and thermoplastic polyimide having a glass transition temperature of 190° C. and a density of 1.1 g/cm³, which serves as a negative electrode binder, were mixed together with N-methyl-2-pyrrolidone as a dispersion medium so that the weight ratio of the active material to the binder became 90:10, to thus prepare a negative electrode mixture slurry.

The resultant negative electrode mixture slurry was applied onto one side of (a roughened surface of) an electrolytic copper foil (thickness 35 µm) having a surface roughness Ra of 1.0 µm, which was a negative electrode current collector, and dried. The amount of the mixture layer on the current collector was 1.32 mg/cm². The resultant article was cut out into a 25 mm×30 mm rectangle shape, then pressure-rolled, and thereafter sintered by heating at 400° C. for 1 hour under an argon atmosphere, and a collector tab was attached thereto to thus prepare a negative electrode.

Preparation of Electrolyte Solution $LiPF_6$ was dissolved at a concentration of 1 mole/liter into a mixed solvent of 3:7 volume ratio of ethylene carbonate and diethyl carbonate. Carbon dioxide was dissolved into the resultant solution by blowing carbon dioxide therein, to thus prepare an electrolyte solution. The electrolyte solution was weighed before and after the carbon dioxide gas blowing to determine the amount of carbon dioxide dissolved in the electrolyte solution, and consequently, the amount of carbon dioxide dissolved was found to be 0.37 weight %. The weight of the electrolyte solution after the carbon dioxide blowing was measured under a carbon dioxide gas atmosphere.

Preparation of Battery

Figure 1:
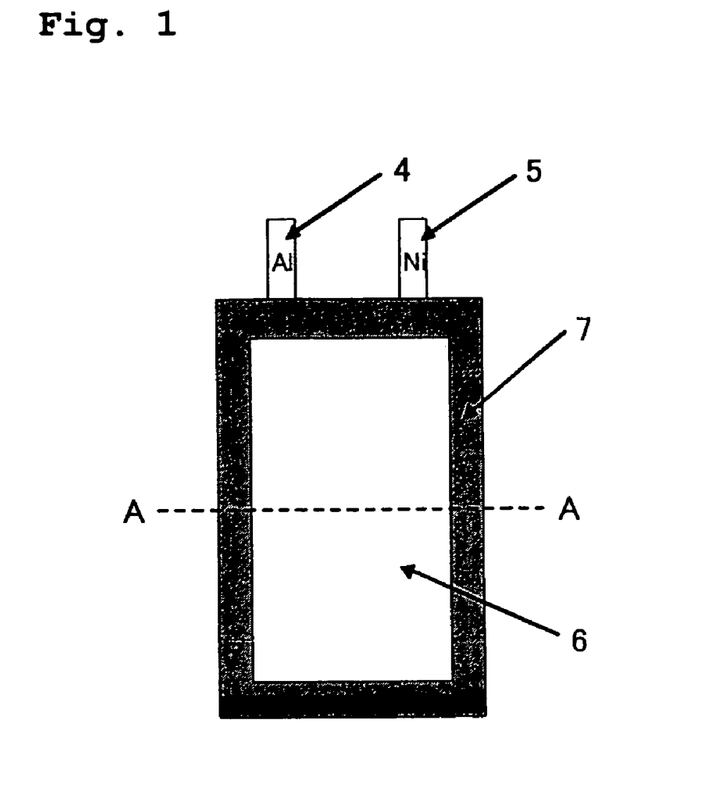
FIG. 1 is a front view illustrating a lithium secondary battery prepared according to one example of the present invention.
Figure 2:
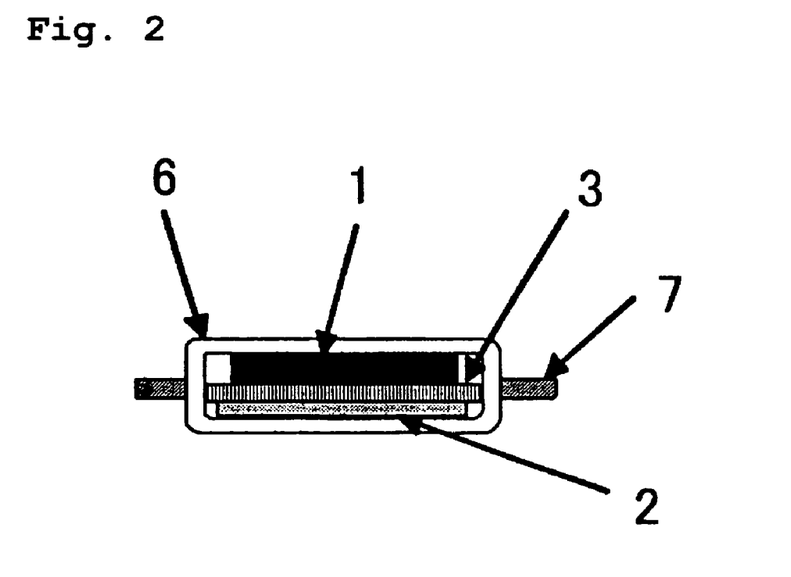
FIG. 2 is a cross-sectional view illustrating the lithium secondary battery prepared according to the example of the present invention.

A lithium secondary battery A1 was prepared, in which the negative electrode, the positive electrode, and the electrolyte solution prepared as described above were inserted in a battery case made of an aluminum laminate. FIGS. 1 and 2 illustrate the lithium secondary battery thus prepared. FIG. 1 shows a front view thereof and FIG. 2 shows a cross-sectional view thereof taken along line A-A in FIG. 1.

As illustrated in FIG. 2, a positive electrode 1 and a negative electrode 2 oppose each other across a separator 3 made of porous polyethylene, and are respectively connected to a positive electrode tab 4 and a negative electrode tab 5, to thus form a structure by which charging and discharging are possible as a secondary battery.

As illustrated in FIGS. 1 and 2, the prepared lithium secondary battery A1 comprised a battery case 6 made of an aluminum laminate, a sealed part 7 at which two ends of the aluminum laminate were heat sealed, a positive electrode current collector tab 4, a negative electrode current collector tab 5, and an electrode assembly in which the separator 3 was sandwiched between the positive electrode 1 and the negative electrode 2.

Experiment 2

Batteries A2 and B1 were fabricated in the same manner as described in Experiment 1, except that the amounts of the negative electrode mixture on the negative electrode current collectors were set at, 1.74 mg/cm² and 1.19 mg/cm², respectively, in preparing the negative electrodes as in Experiment 1.

Experiment 3

In preparing a positive electrode as in Experiment 1, a lithium-transition metal composite oxide represented by the formula $Li_{1.1}Ni_{0.4}Mn_{0.3}Co_{0.3}O_2$ and having an average particle size of about 5 µm was used as the positive electrode active material, which was prepared by mixing the source materials in a mortar so that the mole ratio of Li to the whole of the transition metals became 1.1:1, thereafter sintering the mixture at 1000° C. for 20 hours in an air atmosphere, and then pulverizing the resultant material. Then, Battery A3 was fabricated in the same manner as in Experiment 1, except that the lithium-transition metal composite oxide thus prepared was used, and that the amount of the positive electrode mixture layer on the positive electrode current collector was set at 20.56 mg/cm$^2$. The BET specific surface area of $Li_{1.1}Ni_{0.4}Mn_{0.3}Co_{0.3}O_2$ was 1.06 m$^2$/g.

Experiment 4

In preparing a positive electrode as in Experiment 1, the positive electrode active material was prepared in the following manner; LiOH and a coprecipitated hydroxide represented by the formula $Ni_{0.5}Mn_{0.2}Co_{0.3}(OH)_2$ were mixed in a mortar so that the mole ratio of Li to the whole of the transition metals became 1:1, and the resultant mixture was sintered at 1000° C. for 20 hours in an air atmosphere and thereafter pulverized, to thus obtain a lithium-transition metal composite oxide represented by the formula $LiNi_{0.5}Mn_{0.2}Co_{0.3}O_2$ and having an average particle size of about 5 μm. Then, Battery A4 was fabricated in the same manner as in Experiment 1, except that the lithium-transition metal composite oxide thus prepared was used, and that the amount of the positive electrode mixture layer on the positive electrode current collector was set at 22.54 mg/cm$^2$. The BET specific surface area of $LiNi_{0.5}Mn_{0.2}Co_{0.3}O_2$ used for Battery A4 was 1.49 m$^2$/g.

Experiment 5

In preparing a positive electrode as in Experiment 1, the positive electrode active material was prepared in the following manner; LiOH and a coprecipitated hydroxide represented by the formula $Ni_{0.8}Co_{0.2}(OH)_2$ were mixed in a mortar so that the mole ratio of Li to the whole of the transition metals became 1:1, and the resultant mixture was sintered at 800° C. for 20 hours in an air atmosphere and thereafter pulverized, to thus obtain a lithium-transition metal composite oxide represented by the formula $LiNi_{0.8}Co_{0.2}O_2$ and having an average particle size of about 5 μm. Then, Battery A5 was fabricated in the same manner as in Experiment 1, except that the lithium-transition metal composite oxide thus prepared was used, and that the amount of the positive electrode mixture layer on the positive electrode current collector was set at 22.71 mg/cm$^2$. The BET specific surface area of $LiNi_{0.8}Co_{0.2}O_2$ used for Battery A5 was 0.51 m$^2$/g.

Experiment 6

In preparing a positive electrode as in Experiment 1, the positive electrode active material was prepared in the following manner; $Li_2CO_3$ and $CoCO_3$ were mixed in a mortar so that the mole ratio of Li to Co became 1:1, and the mixture was sintered at 800° C. for 24 hours in an air atmosphere, and then pulverized, to obtain a lithium-cobalt composite oxide represented by the formula $LiCoO_2$ and having an average particle size of about 7 μm. Then, Battery B2 was fabricated in the same manner as in Experiment 1, except that the lithium-transition metal composite oxide thus prepared was used, and that the amount of the positive electrode mixture layer on the positive electrode current collector was set at 22.76 mg/cm$^2$. The BET specific surface area of $LiCoO_2$ was 0.49 m$^2$/g.

Experiment 7

Batteries B3 and B4 were fabricated in the same manner as in Experiment 6, except that the amounts of the negative electrode mixture on the negative electrode current collectors were set at 1.74 mg/cm$^2$ and 1.11 mg/cm$^2$, respectively, in preparing the negative electrodes as in Experiment 6.

Determination of Positive Electrode/Negative Electrode Theoretical Electrical Capacity Ratio With each of the above-described Batteries A1 to A5 and B1 to B4, the theoretical electrical capacity ratio of the positive electrode to the negative electrode (positive electrode/negative electrode theoretical electrical capacity ratio) was obtained from Equation 1 below. Herein, the calculation was made assuming that the theoretical electrical capacity of the silicon powder negative active material was 4195 mAh/g, and the theoretical electrical capacities of the positive electrode active materials were 277.8 mAh/g with $LiNi_{0.4}Mn_{0.3}Co_{0.3}O_2$, 303.1 mAh/g with $Li_{1.1}Ni_{0.4}Mn_{0.3}Co_{0.3}O_2$, and 273.8 mAh/g with $LiCoO_2$. The results are shown in Table 1.

Positive electrode/negative electrode theoretical electric capacity ratio = Weight of positive electrode active material per unit area (g/cm$^2$) × Positive electrode theoretical electric capacity (mAh/g)/Weight of negative electrode active material per unit area (g/cm$^2$) × Negative electrode theoretical electric capacity(mAh/g)    (Eq. 1)

Measurement of Amount of Lithium Carbonate Contained in Positive Electrode Active Material With each of the positive electrode active materials used in the foregoing Batteries A1 to A5 and B1 to B4, the amount of lithium carbonate contained in each of the positive electrode active materials (lithium-transition metal composite oxide powders) was obtained in the following manner.

Each lithium-transition metal composite oxide powder was dispersed in pure water and subjected to ultrasonic treatment for 10 minutes, and then, the lithium-transition metal composite oxide powder was removed by filtering the resultant solution to obtain a filtrate. The filtrate thus obtained was titrated with 0.1N HCl aqueous solution, to obtain the amount of lithium carbonate. The results are shown in Table 1 below.

Evaluation of Charge-Discharge Cycle Performance

Batteries A1 to A5 and B1 to B4 were evaluated in terms of the charge-discharge cycle performance. Each battery was charged at 25° C. with a current of 14 mA to 4.2 V, then charged at 4.2 V until a current of 0.7 mA was reached, and thereafter discharged with a current of 14 mA to 2.75 V. This process was taken as 1 charge-discharge cycle. The charge-discharge cycle was repeated to determine the number of cycles until the discharge capacity of each battery reached 80% of the discharge capacity at the first cycle, and the number of cycles thus obtained was taken as the cycle life of the battery. The results are shown in Table 1. It should be noted that the cycle life values of the batteries are indicated by relative indices wherein the cycle life of Battery A1 is taken as 100.

TABLE 1

| Battery | Positive electrode active material | Theoretical capacity ratio between positive and negative electrodes | Amount of $Li_2Co_3$ contained in positive electrode active material (weight %) | Cycle life |
|---|---|---|---|---|
| A1 | $LiNi_{0.4}Mn_{0.3}Co_{0.3}O_2$ | 1.18 | 0.16 | 100 |
| A2 | $LiNi_{0.4}Mn_{0.3}Co_{0.3}O_2$ | 0.89 | 0.16 | 107 |
| A3 | $Li_{1.1}Ni_{0.4}Mn_{0.3}Co_{0.3}O_2$ | 1.18 | 2.0 | 105 |
| A4 | $LiNi_{0.5}Mn_{0.2}Co_{0.3}O_2$ | 0.89 | 0.31 | 115 |
| A5 | $LiNi_{0.8}Co_{0.2}O_2$ | 0.89 | 1.52 | 122 |
| B1 | $LiNi_{0.4}Mn_{0.3}Co_{0.3}O_2$ | 1.30 | 0.16 | 79 |
| B2 | $LiCoO_2$ | 1.18 | 0.05 | 77 |
| B3 | $LiCoO_2$ | 0.89 | 0.05 | 78 |
| B4 | $LiCoO_2$ | 1.40 | 0.05 | 73 |

Table 1 clearly demonstrates that Batteries A1 to A5 according to the present invention showed longer cycle life than Batteries B1 to B4, which are comparative examples, indicating that the batteries of the present invention have superior charge-discharge cycle performance. The reason is believed to be as follows. In Batteries A1 to A5 according to the present invention, since the positive electrode/negative electrode theoretical electrical capacity ratio was set at 1.2 or less, the utilization factor of the negative electrode was low, and the change in volume of silicon during lithium intercalation and deintercalation was small. Consequently, silicon was prevented from cracking during charging and discharging, and thus, excellent cycle performance was obtained. Moreover, because of the use of a layered lithium-transition metal composite oxide represented by the foregoing chemical formula as the positive electrode active material, the reaction between the positive electrode active material and the non-aqueous electrolyte solution was suppressed during charging and discharging. Furthermore, since the positive electrode active material had a highly stable crystal structure even at a high potential during charge, the transition metals were prevented from being dissolved away from the positive electrode active material, and excellent charge-discharge cycle performance was thus obtained.

In addition, when comparing the cycle life difference between Batteries A1 and A2 with the cycle life difference between Batteries B2 and B3, it will be appreciated that the cycle life difference between Batteries A1 and A2 is greater than that between the cycle life values of Batteries B2 and B3. This also proves that charge-discharge cycle performance in a battery using silicon as its negative electrode active material can be further improved considerably by the use of the lithium-transition metal composite oxide represented by the foregoing chemical formula as the positive electrode active material.

Further, when comparing Batteries A2, A4, and A5, it is appreciated that Batteries A4 and A5, in which the amount of lithium carbonate contained in the positive electrode active material was 0.2 weight % or greater, exhibited superior cycle performance to that of Battery A2. The reason is believed to be as follows. The lithium carbonate decomposed and produced carbon dioxide during charge, that is, when lithium deintercalated from the positive electrode active material and the positive electrode potential increased. The produced carbon dioxide allowed the lithium intercalation/deintercalation reaction at the surface of the negative electrode active material made of silicon to take place appropriately, and served to improve the charge-discharge cycle performance.

For that reason, it is believed that the more lithium carbonate is contained in the positive electrode active material, the better the charge-discharge cycle performance.

Furthermore, when comparing Batteries A2, A4, and A5, it is understood that the greater the amount of Ni component contained in the lithium-transition metal composite oxide, the greater the amount of lithium carbonate contained in the positive electrode active material. Accordingly, it is believed that when the positive electrode active material contains a greater content of Ni component in the lithium-transition metal composite oxide, the positive electrode active material tends to produce a greater amount of lithium carbonate because of the reaction between the lithium component in the oxide and carbon dioxide.

In conventional lithium secondary batteries, the negative electrode capacity is generally controlled to be greater than the positive electrode capacity to prevent the lithium deposition on the negative electrode. Generally, the lithium secondary batteries are designed and fabricated so that the negative electrode/positive electrode capacity ratio (negative electrode/positive electrode) calculated from Equation 2 below falls within the range of from 1.0 to 1.2.

$$\text{Negative electrode/positive electrode capacity ratio} = \frac{\text{Weight of negative electrode active material per unit area (g/cm}^2\text{)} \times \text{negative electrode theoretical electric capacity (mAh/g)}}{\text{Weight of positive electrode active material per unit area (g/cm}^2\text{)} \times \text{Initial charge capacity of positive electrode active material (mAh/g)}} \quad \text{(Eq. 2)}$$

For example, Japanese Published Unexamined Patent Application No. 2002-289175 discloses a lithium secondary battery in which the negative electrode/positive electrode capacity ratio calculated from Equation 2 above is 1.15. For example, with a lithium secondary battery that uses a mixed positive electrode active material set forth in Table 1 of Japanese Published Unexamined Patent Application No. 2002-289175 as its positive electrode active material and a negative electrode X21 set forth in Table 3 as its negative electrode, the negative electrode/positive electrode capacity ratio can be calculated in the following manner.

(i) Positive Electrode:
Positive electrode active material: $LiCoO_2$/$Li_{1.07}Mn_{1.89}Mg_{0.04}$=9/1

Amount of positive electrode active material applied: 430 g/m$^2$ (amount applied per one side=21.5 mg/cm$^2$)

The theoretical electrical capacities obtained from the element composition ratios are:
$LiCoO_2$: 273.8 mAh/g
$Li_{1.07}Mn_{1.89}Mg_{0.04}O_4$: 162.7 mAh/g (ii) Negative Electrode:
Negative electrode active material: natural graphite (theoretical electrical capacity=372 mAh/g)

Amount of negative electrode active material applied: 213 g/m$^2$ (amount applied per one side: 10.65 mg/cm$^2$)

When the above-described lithium secondary battery is charged to 4.2 V, the initial charge electrical capacity of $LiCoO_2$ becomes about 160 mAh/g. Accordingly, the conventional negative electrode/positive electrode capacity ratio calculated according to Equation 2 is found to be 1.15 in the case where the battery is charged to 4.2 V.

The positive electrode/negative electrode theoretical electrical capacity ratio according to the present invention, calculated from Equation 1 above, is found to be 1.43. Therefore, the above-described conventional lithium secondary battery falls outside the scope of the present invention in terms of the positive electrode/negative electrode theoretical electrical capacity ratio.

Reference Experiment

Experiment 8

For comparison, an experiment was conducted with a battery employing natural graphite as the negative electrode active material, to study how the composition of a positive electrode active material affects a battery's charge-discharge cycle performance.

Preparation of Negative Electrode

Natural graphite powder having an average particle size of 18 μm as the negative electrode active material, and polyvinylidene fluoride as the negative electrode binder were mixed together with N-methyl-2-pyrrolidone as a dispersion medium so that the weight ratio of the active material to the binder became 90:10, to thus obtain a negative electrode mixture slurry.

The resultant negative electrode mixture slurry was applied to one side of (a roughened surface of) a rolled copper foil (thickness 35 μm) having a surface roughness of Ra 1.0 μm serving as a negative electrode current collector, and then dried. Four samples were prepared so that the amounts of the mixture layers on the current collectors became 14.83 mg/cm², 19.66 mg/cm², 13.46 mg/cm², and 12.50 mg/cm², respectively, after the mixture was applied, and then dried. The resultant articles were cut out into a 25 mm×30 mm rectangle shape and pressure-rolled to obtain negative electrodes C1, C2, C3, and C4.

Preparation of Battery

Lithium secondary batteries C1, C2, and C3 were fabricated in the same manner as Battery A1 in Experiment 1 except that the negative electrodes C1, C2, and C3 prepared as described above were used, respectively.

Likewise, lithium secondary batteries C4, C5, and C6 were fabricated in the same manner as Battery B2 in Experiment 6 except that the negative electrodes C1, C2, and C4 prepared as described above were used, respectively.

Determination of Positive Electrode/Negative Electrode Theoretical Electrical Capacity Ratio With each of the above-described Batteries C1 to C6, the theoretical electrical capacity ratio of the positive electrode to the negative electrode (positive electrode/negative electrode theoretical electrical capacity ratio) was determined from the previously shown Equation 1. Herein, the calculation was made assuming that the theoretical electrical capacity of the natural graphite powder negative active material was 372 mAh/g. The results are shown in Table 2.

Evaluation of Charge-Discharge Cycle Performance

The above-described Batteries C1 to C6 were evaluated in terms of their charge-discharge cycle performance. Each battery was charged at 25° C. to 4.2 V and thereafter discharged to 2.75 V. This process was taken as 1 charge-discharge cycle. The charge-discharge cycle was repeated to determine the number of cycles until the discharge capacity of each battery reached 80% of the discharge capacity at the first cycle, and the number of cycles thus obtained was taken as the cycle life of the battery. The results for Batteries C1 to C6 are shown in Table 2.

The cycle life values of Batteries C1 to C6 are indicated by relative indices wherein the cycle life of Battery C1 is taken as 100.

TABLE 2

| Battery | Positive electrode active material | Theoretical capacity ratio between positive and negative electrodes | Cycle life |
| --- | --- | --- | --- |
| C1 | $LiNi_{0.4}Mn_{0.3}Co_{0.3}O_2$ | 1.18 | 100 |
| C2 | $LiNi_{0.4}Mn_{0.3}Co_{0.3}O_2$ | 0.89 | 101 |
| C3 | $LiNi_{0.4}Mn_{0.3}Co_{0.3}O_2$ | 1.30 | 99 |
| C4 | $LiCoO_2$ | 1.18 | 106 |
| C5 | $LiCoO_2$ | 0.89 | 107 |
| C6 | $LiCoO_2$ | 1.40 | 105 |

The results shown in Table 2 clearly demonstrate that, when using a carbon material as the negative electrode active material, charge-discharge cycle performance does not improve even if the positive electrode active material according to the present invention is used and the positive electrode/negative electrode theoretical electrical capacity ratio is set at 1.2 or less.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority based on Japanese Patent Application Nos. 2004-276551 filed Sep. 24, 2004, and 2005-212230 filed Jul. 22, 2005, which are incorporated herein by reference.

What is claimed is:

1. A lithium secondary battery, comprising:
a negative electrode containing silicon as a negative electrode active material;
a positive electrode containing a positive electrode active material; and
a non-aqueous electrolyte, wherein
the positive electrode active material is a layered lithium-transition metal composite oxide represented by the chemical formula $Li_aNi_xMn_yCo_zO_2$, where a, x, y, and z satisfy the expressions $0 \leq a \leq 1.3$, $x+y+z=1$, $0<x$, $0 \leq y \leq 0.5$, and $0 \leq z$, and contains 0.2 weight % or greater of lithium carbonate, and
a theoretical electrical capacity ratio of the positive electrode to the negative electrode (positive electrode/negative electrode) is 0.89 or less.

2. The lithium secondary battery according to claim 1, wherein x, y, and z in the chemical formula satisfy the expressions $0<X \leq 0.5$, $0<y \leq 0.5$, and $0 \leq z$.

3. The lithium secondary battery according to claim 1, wherein z in the chemical formula satisfies the expression $0<z$.

4. The lithium secondary battery according to claim 1, wherein the non-aqueous electrolyte contains carbon dioxide dissolved therein.

5. The lithium secondary battery according to claim 1, wherein the lithium-transition metal composite oxide has a BET specific surface area of 3 m²/g or less.

6. The lithium secondary battery according to claim 1, wherein the negative electrode includes a mixture layer containing a binder and active material particles containing silicon and/or silicon alloy, and a current collector made of a conductive metal foil, the mixture layer being disposed on the current collector.

7. The lithium secondary battery according to claim 6, wherein the mixture layer is sintered and disposed on a surface of the current collector.

8. A lithium secondary battery, comprising:
a negative electrode containing silicon as a negative electrode active material;
a positive electrode containing a positive electrode active materials; and
a non-aqueous electrolyte, wherein
the positive electrode active material is a layered lithium-transition metal composite oxide represented by the chemical formula $Li_aNi_xMn_yCo_zO_2$, where a, x, y, and z satisfy the expressions $0 \leq a \leq 1.3$, $x+y+z=1$, $0<x \leq 0.5$, $0 \leq y \leq 0.5$, and $0<z$, and contains 0.2 weight % or greater of lithium carbonate, and
a theoretical electrical capacity ratio of the positive electrode to the negative electrode (positive electrode/negative electrode) is 0.89 or less.

9. The lithium secondary battery according to claim 8, wherein the lithium-transition metal composite oxide has a BET Specific surface area of 3 m²/g or less.

10. The lithium secondary battery according to claim 8, wherein the negative electrode includes a mixture layer containing a binder and active material particles containing silicon and/or silicon alloy, and a current collector made of a conductive metal foil, the mixture layer being disposed on the current collector.

11. The lithium secondary battery according to claim 10, wherein the mixture layer is sintered and disposed on a surface of the current collector.

12. A lithium secondary battery, comprising:
   a negative electrode containing silicon as a negative electrode active material;
   a positive electrode containing a positive electrode active material; and
   a non-aqueous electrolyte, wherein
   the positive electrode active material is a layered lithium-transition metal composite oxide represented by the chemical formula $Li_aNi_xMn_yCo_zO_2$, where a, x, y, and z satisfy the expressions $0 \leq a \leq 1.3$, $x+y+z=1$, $0<x \leq 0.5$, $0 \leq y \leq 0.5$, and $0<z$, and contains 0.2 weight % or greater of lithium carbonate,
   a theoretical electrical capacity ratio of the positive electrode to the negative electrode (positive electrode/negative electrode) is 0.89 or less, and
   the non-aqueous electrolyte contains carbon dioxide dissolved therein.

13. The lithium secondary battery according to claim 12, wherein the lithium-transition metal composite oxide has a BET specific surface area of 3 $m^2/g$ or less.

14. The lithium secondary battery according to claim 12, wherein the negative electrode includes a mixture layer containing a binder and active material particles containing silicon and/or silicon alloy, and a current collector made of a conductive metal foil, the mixture layer being disposed on the current collector.

15. The lithium secondary battery according to claim 14, wherein the mixture layer is sintered and disposed on a surface of the current collector.

* * * * *